United States Patent [19]

Scharpenberg

[11] Patent Number: 4,683,104
[45] Date of Patent: Jul. 28, 1987

[54] EQUIPMENT FOR THE INSPECTION OF FUEL RODS OF NUCLEAR REACTORS

[75] Inventor: Rainer Scharpenberg, Waldmichelbach, Fed. Rep. of Germany

[73] Assignee: Brown Boveri Reaktor GmbH, Mannheim, Fed. Rep. of Germany

[21] Appl. No.: 738,687

[22] Filed: May 28, 1985

[30] Foreign Application Priority Data

May 26, 1984 [DE] Fed. Rep. of Germany ....... 3419765

[51] Int. Cl.$^4$ ............................................. G21C 17/00
[52] U.S. Cl. .................................... 376/251; 376/245
[58] Field of Search .................. 108/138; 12/205, 218; 269/71, 73, 74; 376/245, 251; 248/661, DIG. 13

[56] References Cited

U.S. PATENT DOCUMENTS

| | | | |
|---|---|---|---|
| 2,610,747 | 9/1952 | Hall | 269/73 |
| 3,915,442 | 10/1975 | Marantette et al. | 269/71 |
| 4,036,686 | 7/1977 | Weilbacher et al. | 376/251 |
| 4,217,173 | 8/1980 | Jabsen | 376/251 |
| 4,464,332 | 8/1984 | Boisseuil et al. | 376/245 |
| 4,483,205 | 11/1984 | Bellaiche et al. | 376/245 |

*Primary Examiner*—Salvatore Cangialosi
*Attorney, Agent, or Firm*—Herbert L. Lerner; Laurence A. Greenberg

[57] ABSTRACT

A device for the inspection of fuel rods combined into fuel rod bundles in a fuel element of a nuclear reactor includes a frame for supporting a fuel element including a base plate, a cover plate and four supports in the form of four first leadscrew drive mechanisms, two mutually parallel second leadscrew drive mechanisms attached to and extending transversely to the first leadscrew drive mechanism, a third leadscrew drive mechanism jointly supported by and extending transversely to the second leadscrew drive mechanism, and an accessory carrier mechanism disposed on the third leadscrew drive mechanism and movable in a plurality of levels for entering gaps between fuel rods of the fuel element.

3 Claims, 3 Drawing Figures

EQUIPMENT FOR THE INSPECTION OF FUEL RODS OF NUCLEAR REACTORS

The invention relates to a device for the inspection of nuclear reactor fuel rods bundled together into fuel rod bundles in a fuel element, including a tool or accessory carrier for equipment that may be inserted into gaps between the fuel rods and moved to several levels, and a frame for holding the fuel element and the tool carrier, formed of four supports, a base plate and a cover plate corresponding to U.S. Pat. No. 4,036,686.

A device of this type is known from German Published, Non-Prosecuted Application DE-OS No. 25 58 631. In that device, besides the four supports which form a frame for retaining the fuel element together with the base plate and the cover plate, two U-rails also extend between the base plate and the cover plate. The U-rails serve as guide rails for a frame structure which can travel in vertical direction, the frame structure itself being formed of two U-rails disposed on opposite sides and struts which interconnect them. The U-rails guide a carriage which can travel along the rails and which is constructed in the same way as the aforementioned frame. Finally, a further carriage is guided in the U-rails of this carriage, to which a tool or accessory carrier is attached for inserting mirrors into the gaps between the fuel rods.

When such elaborate and complicated equipment is used for the inspection of fuel elements and the inspection as a rule has to take place under water, it results in an increased susceptibility to repairs. Equipment of this kind is usually decontaminated after use and shipped to another nuclear installation. The heavy and bulky equipment is awkward to transport. For the same reasons, its decontamination leads to difficulties.

It is accordingly an object of the invention to provide equipment for the inspection of fuel rods of nuclear reactors, which overcomes the hereinafore-mentioned disadvantages of the heretofore-known devices of this general type, and which is less complicated, which therefore weighs less, is less susceptible to repairs and can be more easily handled during transport and decontamination.

With the foregoing and other objects in view there is provided, in accordance with the invention, a device for the inspection of fuel rods combined into fuel rod bundles in a fuel element of a nuclear reactor, comprising a frame for supporting a fuel element including a base plate, a cover plate and four supports, columns or pillars in the form of four first leadscrew drive mechanisms integrated into the supports, two mutually parallel second leadscrew drive mechanisms attached to and extending transversely to the first leadscrew drive mechanism, a third leadscrew drive mechanism jointly supported by and extending transversely to the second leadscrew drive mechanism, and an accessory or tool carrier mechanism disposed on the third leadscrew drive mechanism and movable or operable in a plurality of levels for entering gaps between fuel rods of the fuel element.

Apart from its base plate and its cover plate, the device is thus composed entirely of leadscrew drives. The drives not only function as moving devices, but they also act as supports and thereby contribute considerably to the weight reduction and simplification of the equipment.

In accordance with another feature of the invention, each of the leadscrew drive mechanism includes a respective nut in the form of support plate attached to another of the mechanisms.

In this way an immediate motion-transmitting connection is achieved between the leadscrew drives.

In accordance with a concomitant feature of the invention, the first leadscrew drive mechanisms each have an end surface and a motor having a flange, the cover plate being held between the end faces and the flanges.

Other features which are considered as characteristic for the invention are set forth in the appended claims.

Although the invention is illustrated and described herein as embodied in equipment for the inspection of fuel rods of nuclear reactors, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
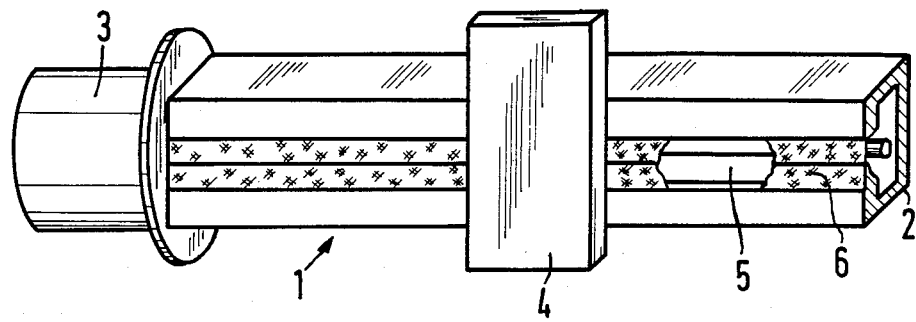
FIG. 1 is a fragmentary, diagrammatic, perspective view, partly broken away, of a leadscrew or worm drive mechanism of the invention.

Referring now to the figures of the drawings in detail and first, particularly, to FIG. 1 thereof, there is seen a worm gear, worm drive or leadscrew drive mechanism 1 acting as a support, which is the basic element of the equipment. As can be seen from the cross section at the end of the device, the leadscrew drive mechanism is formed of a hollow section, with a leadscrew or spindle 2 extending along its longitudinal axis. An electric motor 3 turns the leadscrew 2 causing a non-illustrated leadscrew nut to move a support plate 4 attached to the nut along a slot 5 machined into one of the lateral surfaces of the leadscrew drive. The slot is sealed by means of a sealing lip device 6 even when the support plate is moved, since a non-illustrated connecting element between the leadscrew nut and the support plate 4 is enclosed in the sealing lip device 6. The leadscrew drive is thus sealed on all sides and can therefore be used in a water environment.

Figure 2:
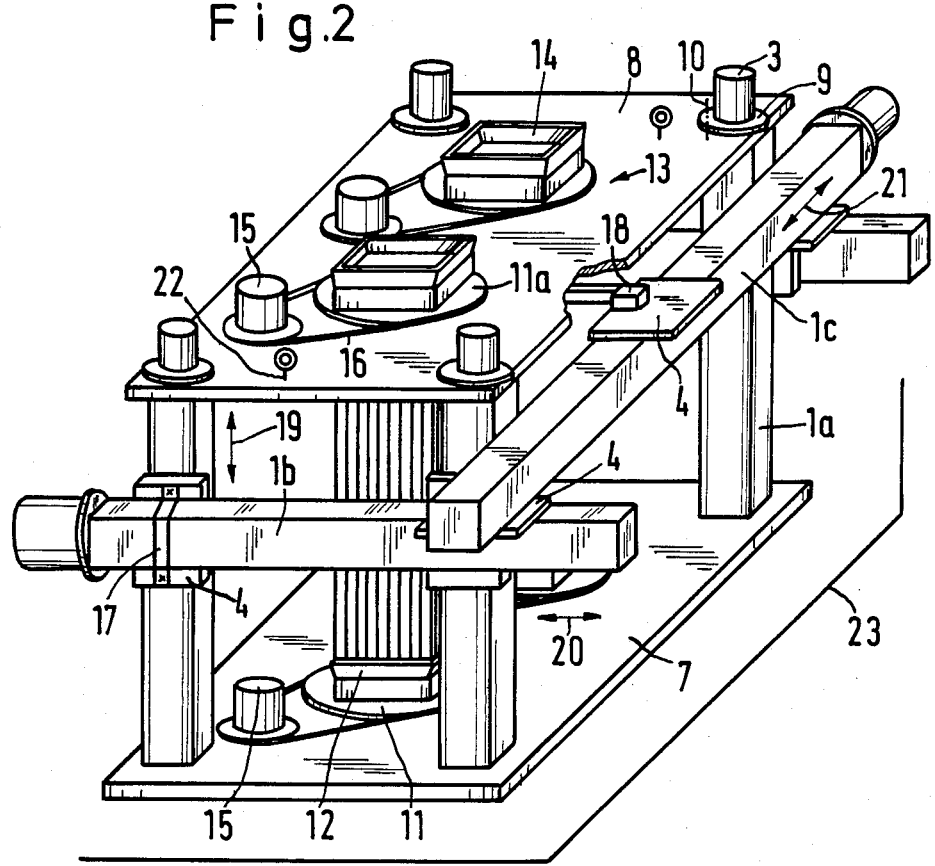
FIG. 2 is another perspective view of the equipment as a whole.
Figure 3:
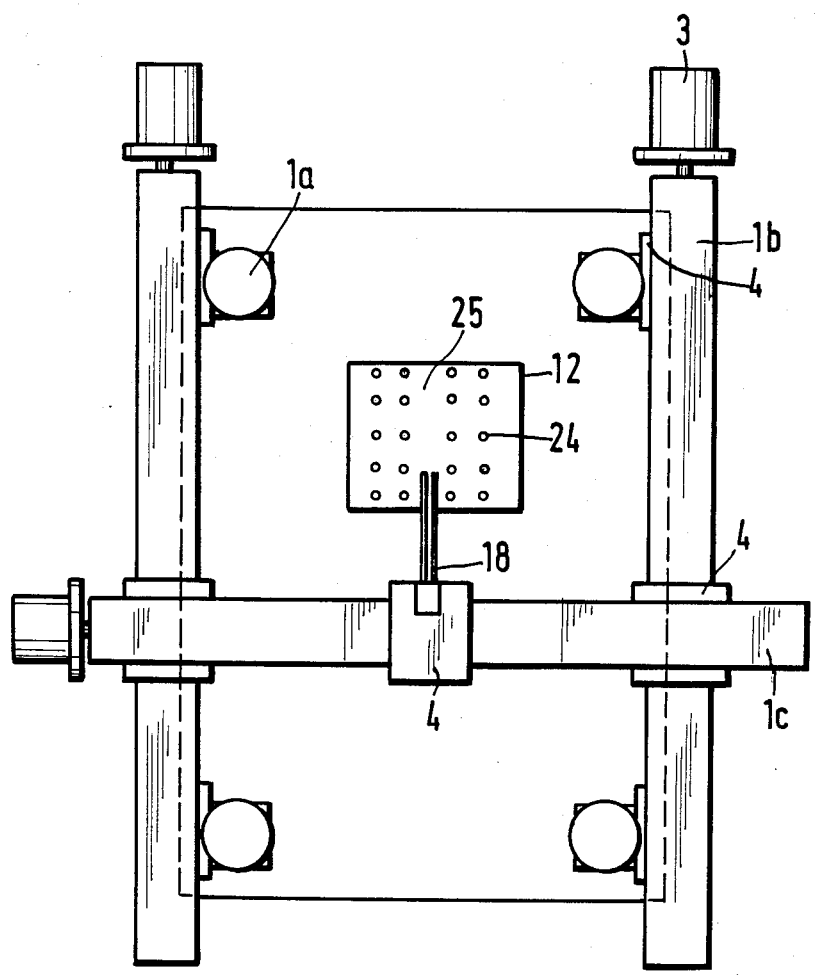
FIG. 3 is a top plan view of a modification of the equipment with the cover plate removed.

A combination of such conventional leadscrew drives results in a device according to the invention as illustrated in FIGS. 2 and 3. According to FIG. 2, four leadscrew drive mechanisms 1a are mounted vertically on a base plate 7. A cover plate 8 which extends parallel to the base plate 7, rests on the front ends of the leadscrew drives facing upward. Electric motors 3 are disposed on the upper surface of the cover plate, while the drive elements thereof, which are each connected with a respective leadscrew 2 of a leadscrew drive mechanism, pass through the cover plate. Flanges 9 of the electric motors 3 serve to fix the cover plate 8 relative to the leadscrew drives 1a which extend in vertical direction. For this purpose, bolts 10 are used which pass through the flange and engage the front ends of the respective leadscrew drive mechanisms 1a. Two rotary plates or turntables 11 are disposed on the base plate 7.

Each of these plates serves for receiving a fuel element 12. The cover plate has openings 13 opposite the rotary plates 11 for accommodating rotary plates 11a fitted with centering devices 14 for the respective fuel element. An actuator 15 is assigned to each rotary plate 11, 11a which can rotate the rotary plate by means of a V-belt 16. The actuators 15 assigned to one fuel element are synchronized and the centering device 14 also serves as a driving device for the fuel element. Each transverse leadscrew drive mechanism 1b is attached to the support plates 4 of two vertical leadscrew drive mechanisms 1a, by means of mounting straps 17. The leadscrew drives 1b, disposed on opposite sides and at the same level, jointly support a further leadscrew drive mechanism 1c with their plates 4a. The support plate 4a of the mechanism 1c carries a tool carrier 18. The electric motors 3 assigned to the vertical leadscrew drives 1a are electrically synchronized, producing a uniform, precise movement of the leadscrew drives 1b in the direction of an arrow 19. The same applies to the electric motors assigned to the leadscrew drive mechanism 1b which are disposed transversely, so that the leadscrew drive mechanism 1c is also moved precisely and uniformly in the direction of an arrow 20. The leadscrew drive mechanism 1c serves to move the tool or accessory carrier mechanism 18 in the direction of an arrow 21.

The inspection of a fuel element is performed as follows: Non-illustrated hoisting gear attached to lugs 22 sets the equipment down in a water-filled fuel element storage pit 23. The fuel element is loaded into the equipment and the inspection can start at once. While the inspection proceeds, a second fuel element is placed into the equipment. Simultaneous loading and inspection leads to a considerable time saving. The rotary plate drive mechanism assigned to a particular fuel element positions the fuel element in such a way that the tool carrier can travel into gaps between the fuel rods. The electric motors 3 can be remotely controlled by non-illustrated cables and by a non-illustrated control unit disposed outside the fuel element storage pit, in such a way that the tool carrier moves to the desired inspection position. As a rule, the tool carrier which can be fitted with various cleaning, inspection, or repair tools, can enter a fuel element at several levels along the longitudinal extent thereof. If the tool carrier enters into the gaps between the fuel rods from different sides, the fuel element is turned 90° by means of the rotary table or plate. The leadscrew drive mechanism 1c to which the tool carrier 18 is attached, can only travel outside the space delimited by a vertical leadscrew drive mechanism 1a. The distance along which the tool carrier can travel along the direction of the arrow 20 by means of the transversely disposed leadscrew drive mechanism 1b, corresponds at least to the width of a fuel element.

FIG. 3 shows a top-plan view of a device of basically identical construction to FIG. 2, with the cover plate removed. The device is constructed for one fuel element only, and the leadscrew drive mechanism supporting the tool carrier 18 travels inside the space delimited by the leadscrew drive mechanism 1a. In FIG. 3, fuel rods 24 and gaps 25 therebetween into which the tool carrier enters, are also shown.

The foregoing is a description corresponding in substance to German application Pat. No. 34 19 765.6, dated May 26, 1984, the International priority of which is being claimed for the instant application, and which is hereby made part of this application. Any material discrepancies between the foregoing specification and the aforementioned corresponding German application are to be resolved in favor of the latter.

I claim:

1. Device for the inspection of fuel rods combined into fuel rod bundles in a fuel element of a nuclear reactor, comprising a frame for supporting a fuel element including a base plate, a cover plate and four supports in the form of four first leadscrew drive mechanisms, two mutually parallel second leadscrew drive mechanisms attached to and extending transversely to said first leadscrew drive mechanism, a third leadscrew drive mechanism jointly supported by and extending transversely to said second leadscrew drive mechanism, and an accessory carrier mechanism disposed on said third leadscrew drive mechanism and movable in a plurality of levels for entering gaps between fuel rods of the fuel element.

2. Device according to claim 1, wherein each of said leadscrew drive mechanism includes a respective support plate attached to another of said mechanisms.

3. Device according to claim 1, wherein said first leadscrew drive mechanisms each have an end surface and a motor having a flange, said cover plate being held between said end faces and said flanges.

* * * * *